United States Patent [19]

Haas et al.

[11] 4,001,645

[45] Jan. 4, 1977

[54] DIE PRESS CONTROL APPARATUS

[75] Inventors: Edgar Haas, New York, N.Y.; Edward Kottsieper, Dresden Mills, Maine

[73] Assignee: Herman Schwabe, Inc., New York, N.Y.

[22] Filed: Mar. 3, 1975

[21] Appl. No.: 554,906

[52] U.S. Cl. .............................. 318/17; 307/113; 317/135 R; 83/534; 83/541
[51] Int. Cl.² ...................................... H01H 47/00
[58] Field of Search .................. 318/625, 17, 446; 83/524, 534, 535, 536, 537, 541; 307/113, 115; 200/76, 298; 317/135, 137

[56] References Cited

UNITED STATES PATENTS

| | | | |
|---|---|---|---|
| 3,436,558 | 4/1969 | Connell et al. | 307/113 |
| 3,575,077 | 4/1971 | Herdeg | 83/534 |
| 3,905,265 | 9/1975 | Peterson et al. | 83/541 |

*Primary Examiner*—Robert K. Schaefer
*Assistant Examiner*—John J. Feldhaus

[57] ABSTRACT

Apparatus is provided for controlling the movement of a member, such as a pressure head in a die press, the die press being of the type wherein the pressure head is horizontally movable relative to the material to be cut or otherwise impressed to locate the head in the desired position above the material. Once positioned, the head is vertically movable into engagement with a die which is pushed through the material to perform the cutting or impressing operation. The apparatus includes means for moving the member in first and second directions along a horizontal plane, preferably in the form of an electrically controlled motor. Means are also provided for moving the pressure member vertically, preferably in the form of an electrically operated hydraulic system. First and second switch means, in the form of triggers or push buttons, are operably connected to both the motor and the hydraulic system and when actuated individually energize the motor to move the pressure member horizontally. The direction of horizontal movement is determined by which switch is actuated. Joint actuation of the switch means energizes the hydraulic system to move the pressure member vertically downward to engage the die to perform the cutting or impressing operation. After the operation is completed, the cutting head is automatically moved upward to its original vertical position. The apparatus can also operate in a semi-automatic mode wherein the head is automatically repositioned horizontally with respect to the material to a location remote from the cutting operation after the operation is completed, such movement being initiated a given time interval after the completion of the previous operation. A memory is utilized to determine the direction of this horizontal movement and a timer is utilized to determine the magnitude thereof. The memory is set in accordance with the sequential actuation of the switch means in the previous cycle.

15 Claims, 4 Drawing Figures

MANUAL OPERATION

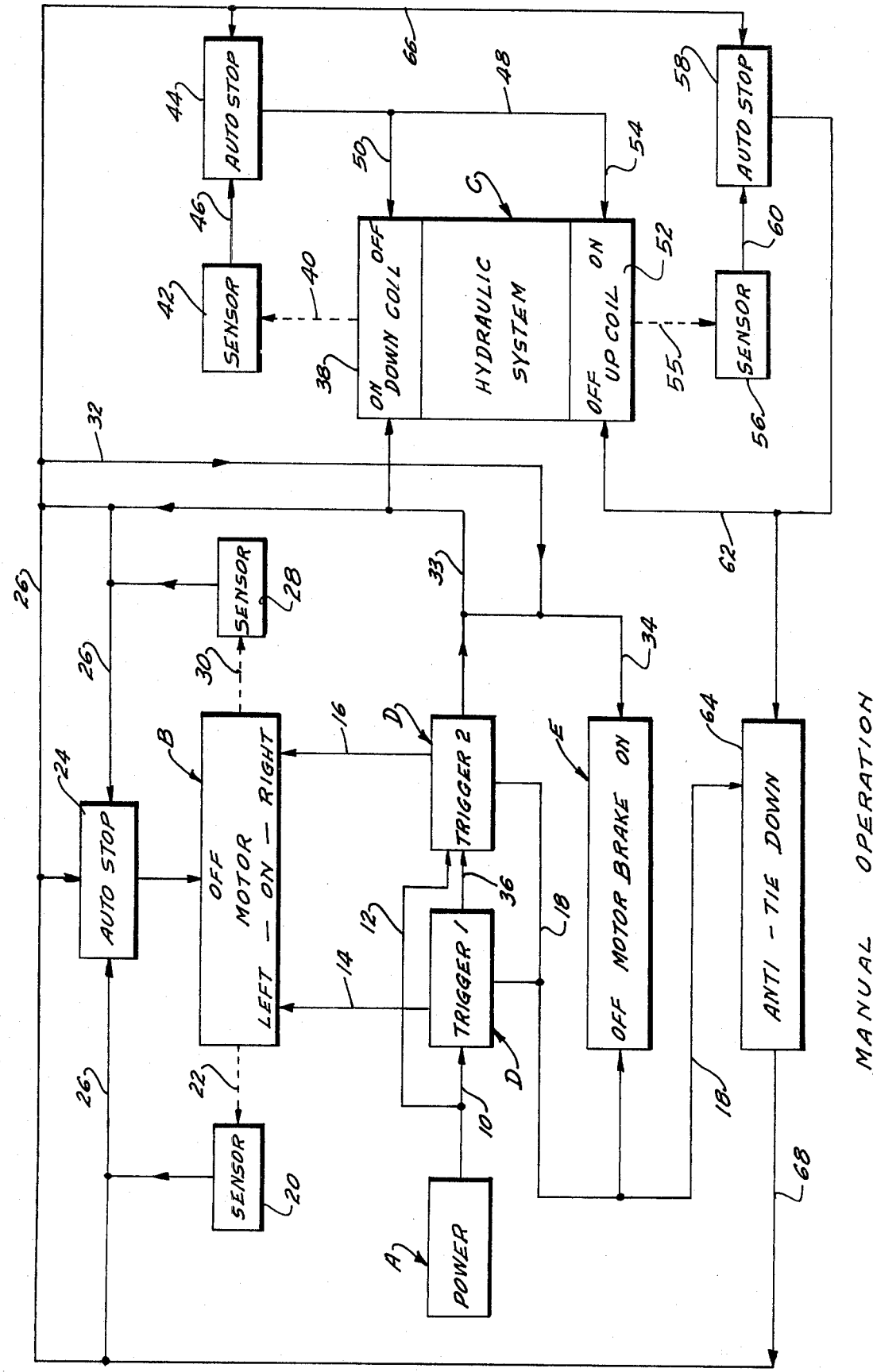

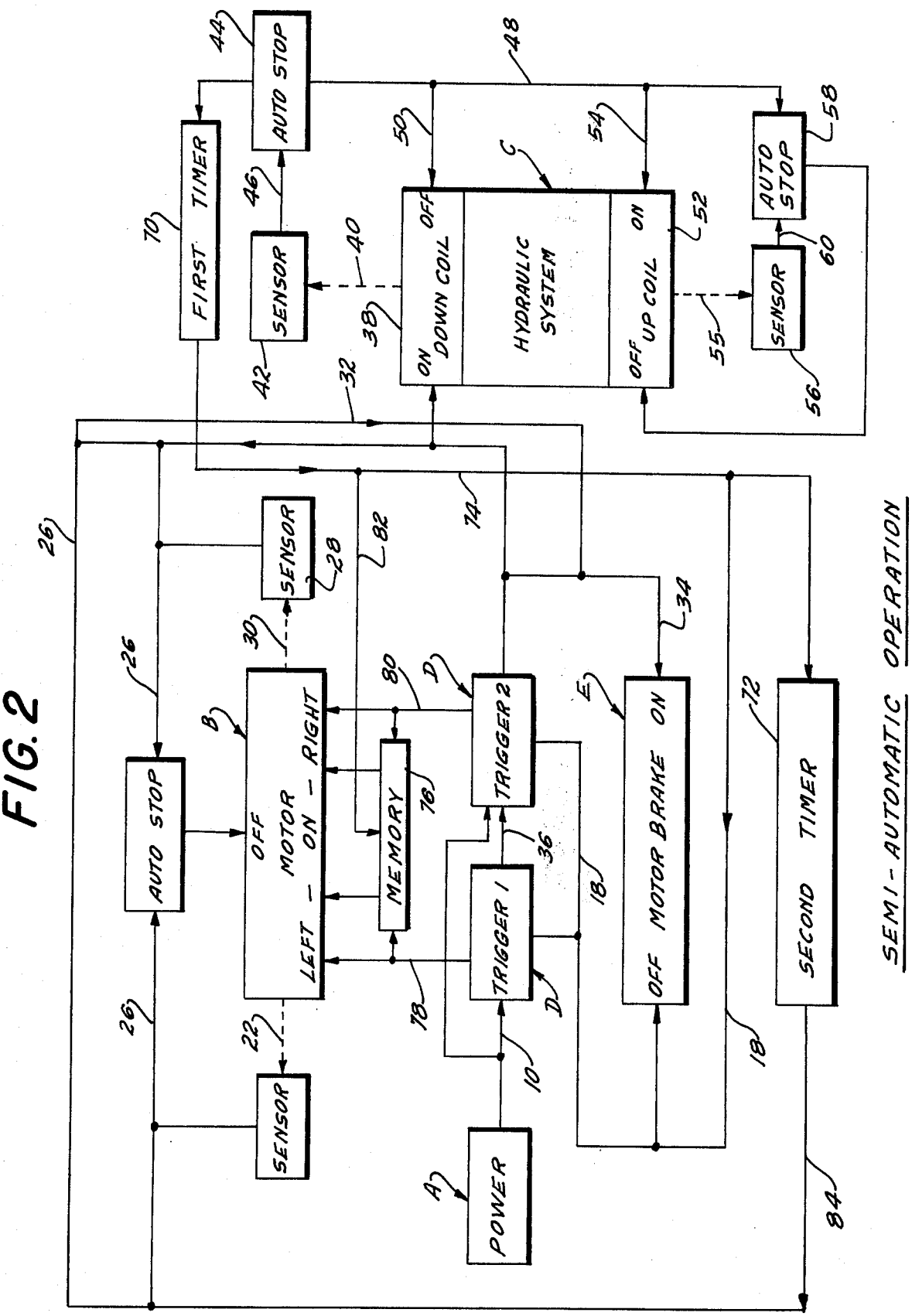

DIE PRESS CONTROL APPARATUS

The present invention relates to control apparatus and more particularly to apparatus for controlling the movement of a member such as a pressure head in a die press.

A die press is a mechanism which is utilized to cut or otherwise impress layers of material such as cloth, leather, etc. The cut or impressed portions are then utilized to form various products, for instance, gloves and shoes. The mechanism consists of a table-like support upon which are placed multiple layers of material upon which the operation is to be performed. A die having the appropriate contours is located over the layers of material at the position where the operation is to be performed. A pressure head is then positioned above the die and caused to move downward into engagement with the die and thus force the die through the layers of material to perform the cutting or impressing operation.

In most conventional die presses the operator must move the die by hand and place it over the appropriate area of the material to be cut. This is dangerous because of the chance that the pressure head can be accidentally actuated, thus injuring the operator's hand. Further, it is time consuming because during each operation, the operator must remove his hands from the press controls, move the die and then replace his hands on the controls.

Moreover, since the dies utilized in a die press are often quite heavy, it is often desirable to provide a die carriage upon which the die is mounted. This is particularly true in the glove industry where the dies tend to be particularly cumbersome. The die carriage is made movable such that the die may be moved relative to the surface of the material. The carriage may be designed such that it can be manipulated from a remote position, thus eliminating the necessity for the operator to put his hands under the pressure head. In addition, a counterbalancing mechanism may be provided such that the machine operator can reposition the die with greater facility. Since the cutting or impressing operations are often performed upon sheets of materials which have a width greater than the width of the die, the cutting or impressing operations are normally performed in side-by-side relationship in a line along the width of the material. After an entire row of operations is completed the material is moved with respect to the mechanism such that a new row of operations may be performed. Thus, it is necessary that the die and die carriage be movable relative to the material such that a row of operations can be performed along the width of the material. This mode of operation requires that the pressure head also be movable along the width of the material such that it can be appropriately positioned over the die regardless of the position of the die along the width of the material. Thus, it is necessary that the pressure member be movable horizontally to the right or left along the width of the material as well as being movable vertically up or down to perform the operation. In addition, in some instances it is desirable to have more than one die available for performing the operation such that the material can be utilized more efficiently. In this instance, a separate movable die carriage is provided for each die and the pressure member is positioned over the appropriate die for each operation.

Die presses having the carriages generally require manual manipulation of the die carriage to properly position the die relative to the material. This is normally performed by means of a handle member connected to the carriage which the press operator physically moves to properly position the die. Often two separate sets of controls are located on the mechanism to regulate the movement of the pressure member. One set of controls regulates the movement of the pressure member right or left along the width of the material in a plane substantially parallel to the surface of the material. For purposes of this explanation this is considered horizontal movement. The second set of controls regulates the movement of the pressure head to cause it to move up and down to perform the cutting operation. This is considered to be vertical movement. Safety considerations require that the set of controls regulating the vertical movement of the pressure head be located on the press in a position out of the path of vertical movement of the pressure head such that it is impossible for the press operator to accidentally place his hand in the path of the vertical movement of the pressure head thereby injuring himself.

The productivity of a press is determined by the number of operations which can be completed by the operator in a given time interval. Thus, it is desirable to reduce the amount of time required for each operation as much as possible without creating a safety hazard for the press operator. Conventional presses require the press operator to manipulate as much as three separate sets of controls at three separate locations on the press. First, the handle member on the die carriage must be physically moved to position the die. Then the electrical controls to move the pressure head horizontally in position must be manipulated and finally the controls for regulating the vertical position of the pressure head must be actuated in order to perform the operation. Therefore, the press operator may be required to reposition his hands on different locations of the press as many as three times during each cutting operation. It is obvious that such repositioning is time consuming and thus reduces the productivity of the press.

It is, therefore, a prime object of the present invention to provide apparatus for controlling the movement of the pressure member in a die press wherein the controls for both the horizontal and vertical movement of the pressure member consist of a single pair of triggers or switches located at the single location on the press.

It is a second object of the present invention to provide apparatus for controlling the movement of the pressure head in a die press wherein the controls consist of a single pair of triggers or push buttons which when actuated individually move the member horizontally to the right or left respectively, and when actuated jointly move the member vertically to perform the cutting operation.

It is a third object of the present invention to provide a press for controlling the movement of the pressure head in a die press wherein the vertical movement of the pressure member requires joint actuation of the triggers or switches thereby insuring that the operator's hands are away from the path of vertical movement of the pressure member when the member is actuated to move vertically.

It is a fourth object of the present invention to provide apparatus for controlling the movement of a pressure member in a die press wherein horizontal movement of a pressure member is prevented during vertical movement thereof.

It is a further object of the present invention to provide apparatus for controlling the movement of a pressure head in a die press which may be operated in a semi-automatic mode such that the pressure member is automatically repositioned to a location remote from the previous cutting area at the completion of the cutting cycle.

It is another object of the present invention to provide apparatus for controlling the movement of a pressure member in a die press which eliminates the necessity for the press operator to reposition his hands during the performance of the operation thus substantially reducing the amount of time required for the performance of each operation while assuring complete safety to the operator.

In accordance with the present invention, apparatus for controlling the movement of a member such as the pressure head in a die press is provided. The member is movable in a first sense, namely, in a plane substantially parallel to the surface of the material upon which the operation is to be performed (horizontal movement) and in a second sense, namely, in a plane perpendicular to the surface of the material (vertical movement). Means, preferably in the form of a motor, associated drive system such as a gear system, a rack and pinion or a belt drive are provided for moving the pressure head horizontally to position the head in the desired location over the material upon which the operation is to be performed. Means, preferably in the form of an electrically operated hydraulic system are provided for moving the pressure head vertically in order to engage the die to perform the cutting operation. First and second switch means, in the form of triggers or push buttons are operably connected to both the motor and hydraulic system and are actuatable separately to energize the motor to move the pressure head in one or the other directions in the horizontal plane, respectively. Further, the switch means are jointly actuatable to energize the hydraulic system to move the pressure member vertically downward to perform the cutting operation.

Third switch means, preferably in the form of a limit switch, are located in the vertical path of movement of the pressure member and are actuatable by the movement of that member at the end of the downward path thereof to cause the hydraulic system to reverse direction thus automatically causing the pressure head to move upward to the original position at the completion of the cutting cycle. Fourth switch means, also located in a vertical path of movement of the pressure member, are provided to automatically de-energize the hydraulic system when the pressure head has returned to its uppermost vertical position. Fifth and sixth switch means, also in the form of limit switches, are located at either end of the path of horizontal movement of pressure head thus preventing the pressure head from moving outside of a prescribed path.

Brake means are provided in conjunction with the motor to prevent the horizontal movement of the pressure member when the motor is not actuated. Actuation of either of the first and second switch means to cause horizontal movement of the pressure head causes energization of the brake means to release the pressure member. However, joint actuation of the first and second switch means causes de-energization of the brake means thus preventing the horizontal movement of the pressure head during vertical movement thereof.

In addition, means for preventing the re-energization of the motor is provided such that once vertical movement has begun, the pressure head cannot be horizontally moved until the pressure head has returned to its original vertical position and both triggers or push buttons have been released. This is an additional safeguard against accidental initiation of horizontal movement of the pressure member.

The apparatus of the present invention can also be operated in a semi-automatic mode wherein repositioning of the pressure head in the horizontal direction to a location remote from the previous operation is automatically performed at the end of the cutting cycle. While the semi-automatic mode of operation is normally utilized on presses without die carriages to reposition the head to a remote location to permit access to the die so that the operator can more easily remove the die, it also may be utilized on presses having die carriages, if desired. This mode of operation is controlled by a memory circuit which stores information concerning the sequence of actuation of the first and second switch means when the switch means are jointly actuated. The pressure member is horizontally moved to the right by actuation of the first switch means and then, when correctly positioned, caused to move vertically by the actuation of the second switch means (while the first switch means continues to be actuated). The memory circuit will store information relative to the sequence of actuation, i.e., that it was the first switch means which was actuated first in sequence. When the pressure member has completed the downward movement, the pressure member is caused to automatically move in the opposite direction determined by the first actuated switch in sequence (in this instance, toward the left) to reposition the head to the desired remote location. The amount of movement in this direction is determined by a travel timer which is preset to the desired time. In addition, another timer is utilized to delay the horizontal movement for a desired time interval after reversal of vertical direction of the head to prevent tearing of the material. When the cutting operation is completed and the pressure plate is moving upward, the pressure member will automatically move away from the die to reposition itself at a remote location.

It should be appreciated that while a variety of different circuit functions and two different modes of operation are described herein as included in the preferred embodiment of the present invention for illustrative purposes, not all of these features need be included in each control apparatus. Variations in the disclosed circuitry may be made in accordance with the particular die press which is used in conjunction with the control apparatus, as well as the intended commercial application thereof. Thus, each apparatus will be designed to best suit the needs of the user and portions of the circuitry may be included or not in accordance with the functions required.

To the accomplishment of the above and to such other objects as may hereinafter appear, the present invention relates to apparatus for controlling the movement of a member, such as a pressure member in a die press, as defined by the appended claims as described in the specification, taken together with the accompanying drawings wherein like numerals refer to the like parts and in which:

FIG. 1 is a block diagram of a preferred embodiment of the present invention showing the control apparatus as it is operated in the manual mode;

FIG. 2 is a block diagram of a preferred embodiment of the present invention showing the control apparatus as it is operated in the semi-automatic mode.

GENERAL DESCRIPTION OF OPERATION

Figure 3A:
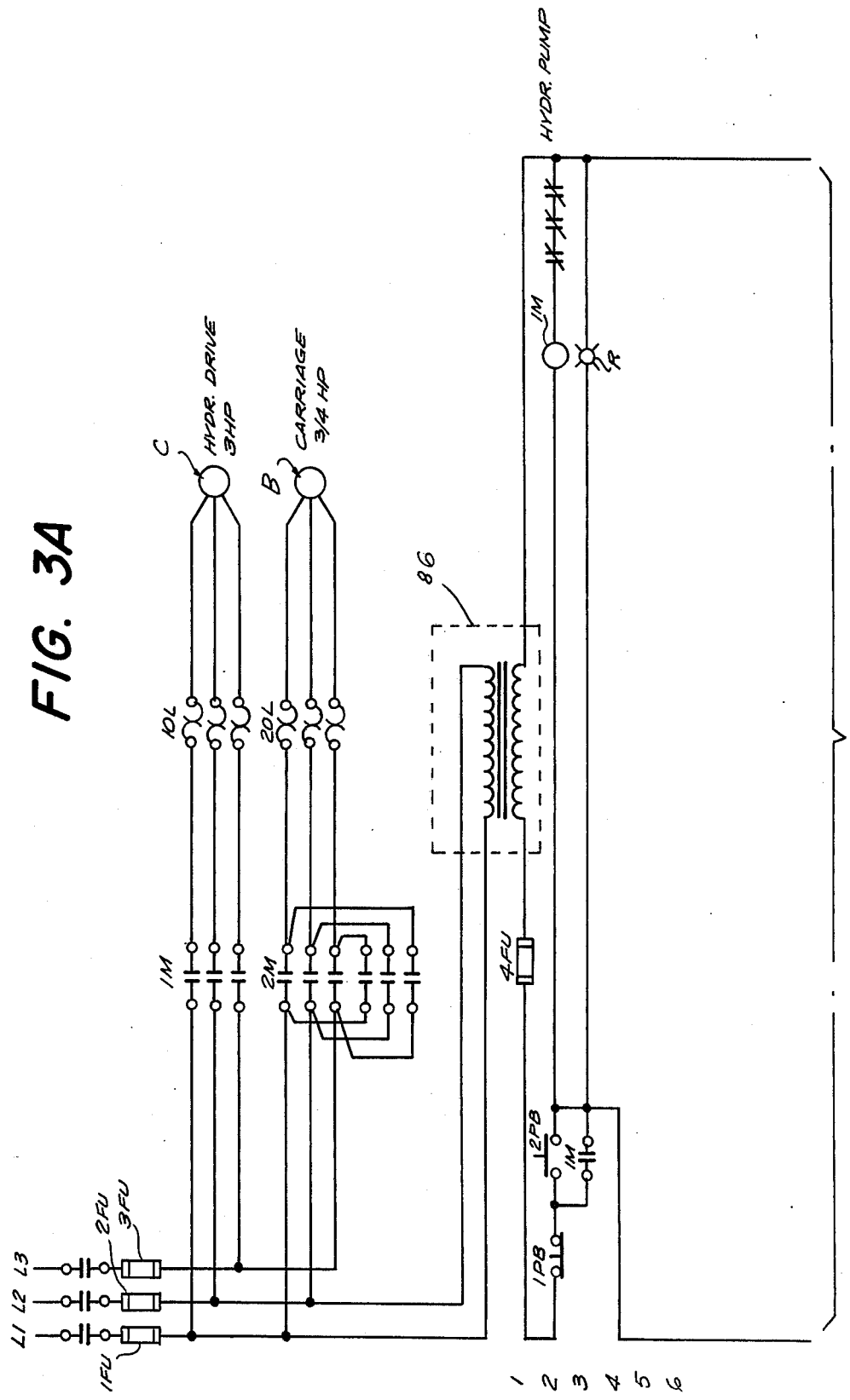
FIGS. 3A and 3B combined show a schematic diagram of the circuitry of the control apparatus of the present invention.

FIG. 1 shows a block diagram of the circuitry of the present invention as it operates in the manual mode. A power source, generally designated A, is connected to a motor, generally designated B, and an electrically activated hydraulic system, generally designated C, by means of a pair of switches, generally designated D. Working in conjunction with motor B is a motor brake, generally designated E, which is also controlled by switches D. Motor B can be energized to move the pressure head horizontally in one of two directions, designated as left and right, respectively. Hydraulic system C can be utilized to move the bottom portion of the pressure head vertically in one of two directions, designated as down and up, respectively. The hydraulic system is energized by electrically connecting the appropriate coil with the power source A.

Although the switches are designated as triggers, they need not take this form and can be any form of actuatable switch such as a depressible push button. However, since the switches are preferably located on the handle member of the die carriage, triggers may be preferable as they provide a suitable grip for the operator's hands. Although switches D can be located anywhere on the press out of the path of vertical movement of the head, it is preferable to locate these switches on the handle member of the die carriage such that all of the controls of the press are located at a single point on the press so that the press operator need not reposition his hands at all during the cutting operation.

The performance of a cutting or impressing operation is commenced by the positioning of the pressure head over a die located above the region of material upon which the operation is to be performed. This is accomplished by actuating one or the other of switch means D to energize motor B and release brake E such that the pressure chamber is moved horizontally to the desired position. Power source A is connected to trigger 1 by means of connection 10 and in a similar manner is connected to trigger 2 by connection 12. Triggers 1 and 2 are separately actuable to energize motor B to move the pressure head to the left or to the right, respectively. If trigger 1 is actuated, power is fed to motor B by means of connection 14 thereby causing the pressure member to move to the left. In a similar manner, if trigger 2 is actuated power source A is connected to motor B by means of connection 16 energizing motor B to move the pressure head to the right. The actuation of either trigger 1 or trigger 2 also releases motor brake E by means of a connection 18. The de-actuation of the trigger causes brake E to once again prevent horizontal movement of the pressure member.

If trigger 1 is actuated the pressure member will move to the left until the trigger is released or sensor 20 is actuated. Sensor 20 is placed in the path of horizontal movement of the pressure member which is designated by dashed arrow 22. Sensor 20 is a limit switch which is tripped at the desired position to shut motor B off by means of an automatic stop 24. Sensor 20 is connected to automatic stop 24 by means of connector 26. In a similar manner, a second sensor 28 is placed in the path of horizontal movement of the pressure member to the right designated by dashed arrow 30, and consists of a limit switch which also actuates automatic stop 24 to shut off motor B when the pressure member has reached the end of its permissible path to the right.

Connector 26 connects sensors 20 and 28 to automatic stop 24 and also to connector 32 which in turn is connected to brake E by means of connector 34. Thus, the individual actuation of either trigger 1 or trigger 2 energizes motor B and releases motor brake E such that the pressure member can move horizontally in the direction determined by the particular switch actuated. The de-actuation of the trigger or the actuation of either of the sensors 20 or 28 causes motor B to be de-energized and motor brake E to prevent horizontal movement of the pressure member.

Normally, the operator positionsd the pressure member by actuating a single trigger until the pressure member is moved to the desired position. Should the operator forget to de-energize the trigger, the sensors and automatic stop function will prevent the pressure member from moving outside the permissible path. The release of the trigger or the actuation of a sensor not only de-energizes motor B but simultaneously de-energizes motor brake E such that the pressure member is stopped and held in position. In this manner the pressure member is positioned for the performance of the die-cutting operation.

After the pressure member is appropriately positioned, both triggers are actuated jointly such that power source A is connected through trigger 1, a connection 36, trigger 2 and connection 33 to energize down coil 38 of hydraulic system C. The signal on connection 33 also causes automatic stop 24 to be actuated thereby preventing the accidental actuation of motor B. In addition, connector 34, also connected to connector 33, transfers this signal maintaining motor brake E in the de-energized condition. This is a safety feature which prevents the horizontal movement of the pressure member during vertical movement thereof.

The energization of down coil 38 causes the pressure head to move in the downward direction (indicated schematically by dashed arrow 40) until a sensor 42 is reached at the end of the downward path. Sensor 42 is actuated after the cutting operation is performed and the head has moved to its maximum downward position. The actuation of sensor 42 in turn actuates an automatic stop 44 by means of a connector 46. Automatic stop 44 via connector 48 de-energizes down coil 38 by means of a connector 50. Connector 48 is also connected to up coil 52 by means of connection 54. Thus, when automatic stop 44 causes down coil 38 to turn off, up coil 52 is automatically turned on thereby causing a pressure member to reverse direction and to move vertically upward.

The path of vertical movement upward is schematically represented by dashed arrow 55. At the uppermost position of the pressure member a sensor 56, in the form of a limit switch, is provided to de-energize up coil 52. Sensor 56 is connected to an automatic stop 58 by means of connector 60. Automatic stop 58 in turn is connected to up coil 52 by means of connector 62. Thus, when the pressure member reaches it original vertical position, sensor 56 detects this and automatic stop 58 causes the up coil to de-energize.

An anti-tie-down circuit 64 is provided connected to connector 62 and connector 18 such that it receives signals from triggers 1 and 2 as well as automatic stop 58. Anti-tie-down circuit 64 is energized by the signal from automatic stop 58 which carries information concerning the de-energization of the up coil. Anti-tie-down circuit 64 senses whether either or both of triggers 1 and 2 remain depressed after the deenergization of up coil 52 by means of connector 18. If both triggers 1 and 2 have not been released, anti-tie-down circuit 64 energizes automatic stop 24 via connector 68 and automatic stop 44 and automatic stop 58 by means of connector 66 to prevent any movement of the pressure member, either in the horizontal or vertical directions, until both the triggers are de-actuated. This prevents an accident due to unexpected movement of the pressure member after the cutting cycle is complete if the press operator has inadvertently forgotten to release one or both of the triggers. Thus, for the cutting cycle to be restarted, both triggers must be de-actuated at the same time.

FIG. 2 shows the control apparatus as it is operated in the semi-automatic mode. Again, power source A is connected to motor B and hydraulic system C by means of triggers D, in the manner described above. The individual actuation of either trigger 1 or trigger 2 energizes motor B to move the pressure member to the left or the right, respectively. Sensors 20 and 28 are again provided to limit the path of movement of pressure member B and to actuate automatic stop 24 to turn off motor B in the event that the path limit is reached. In addition, connections 32 and 34 are provided to de-energize motor brake E when the appropriate sensor is actuated. Further, as before, connection 18 is provided to release motor brake E when either of the triggers is actuated and to de-energize the brake when both triggers are de-actuated.

The joint actuation of triggers 1 and 2 connects power source A to down coil 38 of hydraulic system C. In addition, the joint actuation of trigger 1 and trigger 2 also serves to energize automatic stop 24 to prevent actuation of motor B and to cause motor brake E to be de-energized to prevent the horizontal movement of the pressure member. The cutting cycle is performed as described above. The joint actuation of triggers 1 and 2 energizes down coil 38 to move the pressure member along path 40 until sensor 42 is actuated. The actuation of sensor 42 causes actuation of automatic stop 44 through connector 46. Automatic stop 44, through connector 43, causes down coil 38 to de-energize when the pressure member has moved to its maximum downward position. Automatic stop 44 then simultaneously energizes coil 52 to initiate the upward movement of the head.

Automatic stop 44 also energizes a first timer 70 which begins a first timing operation as the head reverses direction. After a given interval, determined by timer 70, which delays the horizontal movement and the pressure member to avoid tearing the material, timer 70 energizes a second timer 72 by means of a connection 74. Connection 74 is also connected to connection 18 such that simultaneous with the energization of timer 72 motor brake E is energized thus permitting the horizontal movement of the pressure member when the energization of motor B occurs. Timer 72 determines the horizontal distance which the member will be moved.

A memory circuit 76 is provided connected to triggers 1 and 2 by connections 78 and 80, respectively. Normally, the press operator will move the pressure member horizontally in one direction, for instance, left, by actuating trigger 1 to position the pressure head. Without releasing trigger 1, when the pressure head is in the desired position, trigger 2 will be actuated thereby causing the horizontal movement of the pressure head to terminate and the vertical downward movement of the pressure head to commence. Thus, although the initiation of the vertical member movement requires the joint actuation of triggers 1 and 2, these triggers will normally be actuated in sequence as opposed to simultaneously. Memory circuit 76 stores information concerning the sequential actuation of triggers 1 and 2. If trigger 1 was actuated first, then the pressure head was moved to the left to position the head. Therefore, after the cutting cycle is complete, the head will be automatically repositioned to a remote location by causing the head to move to the right and thus out of the way of the die.

When timer 70 has completed its cycle, memory 76 is energized by means of connection 82 simultaneously with the energization timer 72 and the energization of motor brake E. Memory circuit 76 energizes the motor to move the pressure head in the direction determined by the first actuated trigger in sequence when the triggers have been jointly actuated. Thus, in this case, since trigger 1 was actuated first, memory circuit 76 will cause motor B to move the pressure head to the right. Motor B will continue to move the pressure head to the right for the time interval determined by timer 72. If the position of the pressure member at the commencement of this movement is too far to the right, sensor 28 will sense the pressure member at the end of the permissible path and actuate automatic stop 24 to turn off motor B and to de-energize motor brake E. Otherwise, after motor B has been energized for the time interval determined by timer 72, motor B is automatically de-energized by automatic stop 24, which is connected to the output of travel timer 72 by means of connection 84. In addition, since connector 84 is connected to connector 26 which in turn is connected to connector 32 and connector 34, timer 72 also serves to de-energize brake 34.

During the horizontal movement of the pressure member, the vertical movement in the upward direction is taking place until sensor 56 senses the pressure member at the uppermost position. At this point sensor 56 energizes automatic stop 58 to shut off up coil 52.

It should also be appreciated that timer 70 is required because this timer delays initiation of horizontal movement of the pressure member after the downward movement thereof is completed such that the member clears the layers of material before horizontal movement is initiated. This prevents tearing or ripping of the material as the pressure member is horizontally moved.

DETAILED CIRCUITRY FOR CONTROLLING OPERATION

Figure 3B:
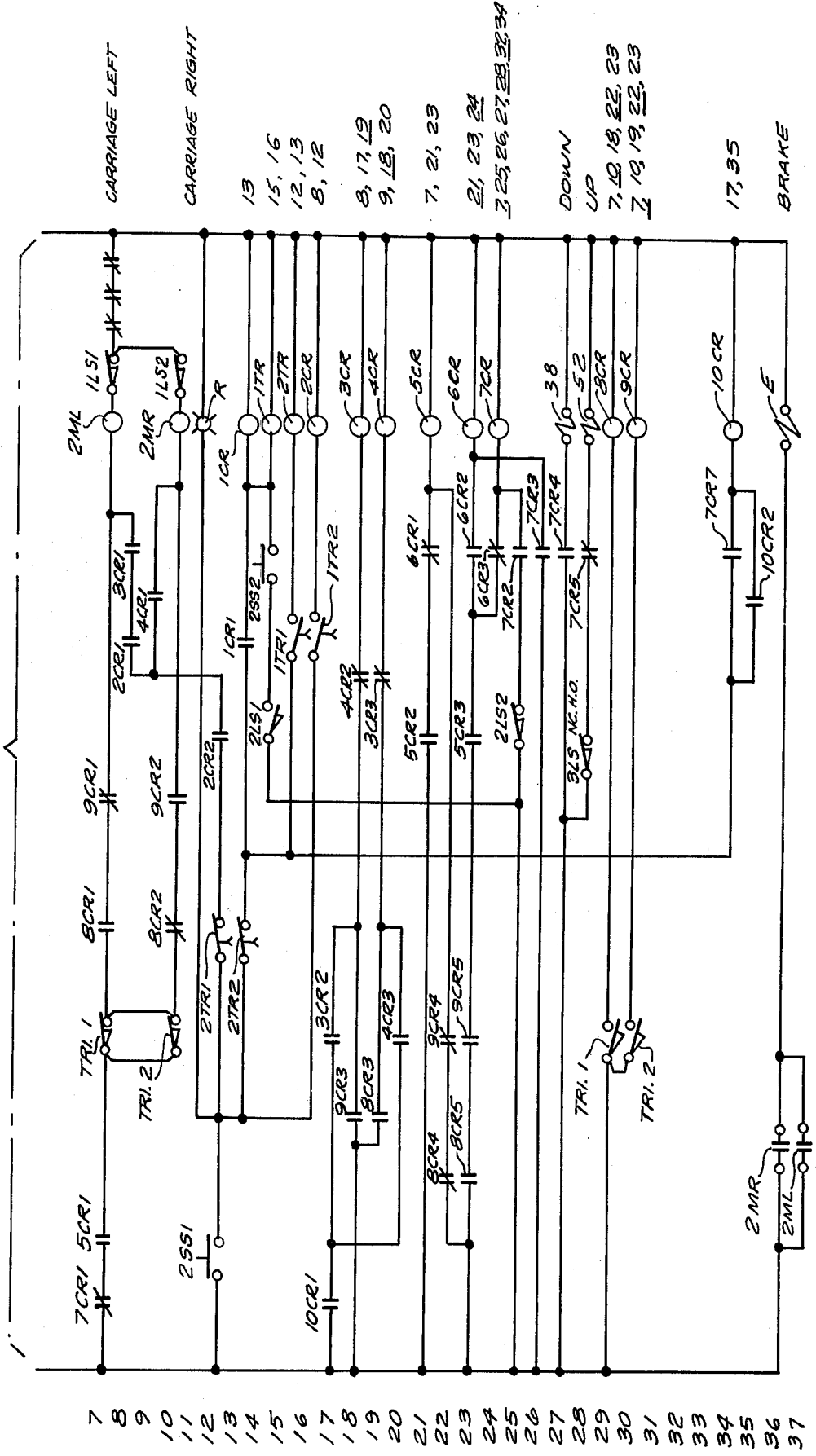

FIGS. 3A and 3B show a schematic diagram of the circuitry. The numerals along the left-hand side of the diagram are utilized to indicate a horizontal row of components for ease of reference. The numbers along the right-hand side of the diagram indicate the location or locations of the contacts of the relay in that row. The underscored row designations indicate that the contacts in that row are normally closed. All other contacts are assumed to be normally opened unless otherwise indicated.

Referring to diagram 3A, the power input to the circuit comprises three lines indicated L1, L2, and L3, respectively. Each line has its respective fuse, designated 1FU, 2FU, and 3FU, respectively. Each of the three power input lines is connected to the three phase electric control for the hydraulic system C through one of three sets of contacts designated 1M and respective circuit breakers designated 10L. The closing of the appropriate contacts 1M will energize the hydraulic drive motor. In a similar manner, each of the lines is connected to the three phase motor B through contacts designated 2M and circuit breakers designated 20L. The closing of the appropriate contacts 2M will energize motor B to move the pressure head to the left or to the right. Lines L1 and L2 are also connected to a transformer 86 which provides the power connection to the control circuit. A fourth fuse 4FU is connected to the output of transformer 86 to prevent an overload.

On line 2 is provided a power switch 1PB which is normally closed. In series with 2PB is a second push button switch 2PB which is normally opened. The actuation of switch 2PB connects transformer 86 with the motor starter designated 1M. In this diagram, circuit relays are indicated by a circle and the contacts associated therewith are indicated by two closely situated parallel lines which are designated accordingly. A line drawn across the contacts indicates that the contacts are normally closed. For instance, motor starter 1M, when energized, will close the contacts situated on line 3 (also designated 1M) to contact hydraulic system C to power input lines L1, L2 and L3. The closing of contacts 1M also energizes pilot light R connected in series with contacts 1M on line 3. Pilot light R indicates that the hydraulic drive motor is energized.

The turning on of the power energizes circuit relay 5CR (line 21) through normally closed contacts 8CR4 and 9CR4 on line 22. Reading the numbers on the right of line 21 indicates that the contacts for circuit relay 5CR are located on lines 7, 21 and 23. These contacts are designated as 5CR1, 5CR2, and 5CR3, respectively. The energization of circuit relay 5CR causes contacts 5CR1, 5CR2 and 5CR3 to close. Circuit relay 5CR is maintained in the energized position because in line 21 contacts 5CR2, which were closed by the energization of circuit relay 5CR, and contacts 6CR1, which are normally closed, form a series circuit with circuit relay 5CR.

Each of the triggers D has two sets of contacts. The contacts of trigger 1 are designated TRI.1, and are located on lines 7 and 29, respectively. The sets of contacts for trigger 2 are designated TRI.2, and are located on lines 10 and 30, respectively. Contacts TRI.1 and TRI.2 on lines 7 and 10, respectively, are normally closed. Contacts TRI.1 and TRI.2 on lines 29 and 30, respectively, are normally opened.

In order to move the pressure head, one of the triggers (but not both) must be actuated. Which trigger is actuated determines the direction of movement. The actuation of trigger 1 causes contacts TRI.1 to close (line 29) thereby energizing circuit relay 8CR. The energization of circuit relay 8CR causes contacts 8CR1 (located on line 7) to close. The closing of contact 8CR1 causes motor starter 2ML to energize in turn closing the appropriate contacts 2M to energize motor B to move pressure member to the left. This occurs because on line 7 contacts 7CR1 are normally closed, contacts 5CR1 have been closed because circuit relay 5CR is energized, TRI.1 is opened but bypassed because TRI.2 is closed, contacts 8CR1 have been closed as indicated above and contacts 9CR1 are normally closed.

Also situated in line 7 is a normally closed limit switch 1LS1 which corresponds to sensor 20 in FIGS. 1 and 2. This limit switch is placed in the path of movement of the pressure head such that it is opened to automatically deenergize starter 2ML when the pressure head has moved to the limit of its path of travel.

In addition, the closing of motor starter 2ML causes contacts 2ML, line 37, to close energizing motor brake E to permit the motor to move the pressure member. (Brake E is normally active to prevent the horizontal movement of the member. Energization of brake E causes the brake to release and permit horizontal movement of the member.) In this manner, the pressure member is moved toward the left until trigger 1 is released or limit switch 1LS1 tripped. The releasing of trigger 1 causes contacts TRI.1 (line 29) to open de-energizing circuit relay 8CR and opening contacts 8CR1 thus braking the series connection on line 7. This causes motor starter 2ML to de-energize turning off the motor and in turn causes contacts 2ML on line 37 to open thus causing brake E to de-energize.

In order to move the pressure member to the right, trigger 2 is actuated thereby closing contacts TRI.2 on line 30 and opening contacts TRI.2 on line 10. The closing of contacts TRI.2 (line 30) causes circuit relay 9CR1 to energize thereby opening normally closed contacts 9CR1 on line 7 and closing contacts 9CR2 on line 10. The opening of contacts 9CR1 prevents the actuation of motor starter 2ML and energizes motor starter 2MR on line 10. (Contacts 8CR2 are normally closed and open contacts TRI.2 on line 11 are bypassed by contacts TRI.1 which are closed.) The energization of motor starter 2MR energizes motor B to move the pressure member to the right.

In addition, the energization of motor starter 2MR closes contacts 2MR (line 36), thereby energizing motor brake E and permitting the movement of the pressure member toward the right. Limit switch 1LS2, in series with motor starter 2MR, corresponds to sensor 28 and it is placed at the end of the path of permissible movement of the pressure member toward the right. This switch is normally closed but when the member reaches the designated position, switch 1LS2 is opened thereby automatically de-energizing motor B and de-energizing brake E to stop the movement of the pressure member. When trigger 2 is released, contacts TRI.2 (line 30) are opened, de-energizing circuit relay 9CR, closing contacts 9CR1 and opening contacts 9CR2 thus de-energizing motor starter 2MR to turn motor B off and de-energize brake E.

It should be noted that the individual actuation of one of the triggers permits only one of the motor starters 2ML or 2MR to be energized at a time. This is because of the parallel placement of the contacts for triggers TRI.1 and TRI.2 on lines 7 and 10, respectively. Since these contacts are normally closed, joint actuation of both triggers prevents energization of either starter 1ML or 2MR. This configuration prevents the movement of the pressure head in the horizontal direction when both triggers are actuated. Since the joint actuation of the triggers will cause vertical movement of the pressure head, as described in detail below, this feature is a safety feature which prevents horizontal movement of the pressure head during the vertical movement thereof.

The initiation of the downward vertical movement of the pressure member is accomplished through the joint actuation of triggers 1 and 2. This joint actuation automatically prevents energization of motor B and de-energization of motor brake E as explained above. The joint actuation of triggers 1 and 2 initiates the cutting stroke by energizing down coil 38 which in the circuit diagram appears on line 27. This is accomplished because joint actuation of triggers D closes contacts TR1 and TR2 (lines 29 and 30, respectively), thus energizing circuit relays 8CR and 9CR, respectively. The energization of circuit relays 8CR and 9CR cause contacts 8CR5 and 9CR5 located on line 23 to close. Since contacts 5CR3 are already closed (because circuit relay 5CR is energized when the power to the circuit is turned on) and since contacts 6CR3 (line 24) are normally closed, circuit relay 7CR on line 24 is energized. The engerization of circuit relay 7CR causes contacts 7CR1 (located on line 7) to open, preventing accidental actuation of motor B and providing an additional safeguard against horizontal movement of the pressure member. The energization of circuit relay 7CR causes contacts 7CR2 (line 25) to close, thus maintaining circuit relay 7CR in the energized mode through a series connection with a normally closed limit switch 2LS2 (corresponding to sensor 42 in FIGS. 1 and 2) on line 25.

The energization of circuit relay 7CR also closes contacts 7CR4, located on line 26, thereby energizing down coil 38 and causing the pressure member to move in the downward direction. In addition, the energization of circuit relay 7CR causes normally closed contacts 7CR5 on line 28 to open, thereby preventing the energization of up coil 52 during the time when dowm coil 38 is energized. Further, as the pressure member leaves the maximum up position, limit switch 3LS (corresponding to sensor 56 in FIGS. 1 and 2) on line 28, is closed. Moreover, relay 7CR remains energized, thus keeping contacts 7CR5 opened and preventing the actuation of the up coil 52. Limit switch 2LS2 is held closed until the pressure member reaches the maximum downward position at which time limit switch 2LS2 opens.

The energization of circuit relay 7CR also causes the closing of contacts 7CR3 on line 26 which in turn causes the energization of circuit relay 6CR. The energization of circuit relay 6CR causes normally closed contacts 6CR3 on line 24 to open, thereby interrupting the alternate path of energization to circuit relay 7CR. thus, when limit switch 2LS2 opens (end of downward movement of pressure head), relay 7CR will de-energize. Contacts 6CR2 on line 23 retain circuit relay 6CR in the energized mode and the energization of circuit relay 6CR causes contacts 6CR1 (line 21) to open, thereby de-energizing circuit relay 5CR. Contacts 5CR2, 5CR2, and 5CR3, respectively, located on lines 7, 21 and 23 will thus open. The opening of contacts 5CR3 will de-energize circuit relay 6CR.

It should be noted that circuit relay 7CR will remain energized only as long as triggers 1 and 2 are jointly depressed or limit switch 2LS2 remains closed. The release of either trigger 1 or trigger 2 (and the opening of limit switch 2LS2) will de-energize circuit relay 7CR because of contacts 8CR5 and 9CR5, located on line 23 and limit switch 2LS2, located on line 25, which are the alternate paths of energization. The de-energization of circuit relay 7CR (by release of the triggers or opening the limit switch) will automatically cause contacts 7CR4 (line 26) to open, shutting off down coil 38 and contacts 7CR5 (line 27) to close, thereby energizing up coil 52, thus causing a reversal in direction of the pressure member. If the pressure head is permitted to complete the cutting stroke, limit switch 2LS2 (line 25) will open, thus de-energizing circuit relay 7CR which de-energizes down coil 38 (because of the opening of contacts 7CR4) and energizes up coil 52 (by the closing of contacts 7CR5). Thus, at the end of the preset cutting stroke, the vertical direction of the pressure member is automatically reversed. The pressure member ascends until, at the end of the up stroke, limit switch 3LS (line 28) opens de-energizing up coil 52 and completing the cutting cycle.

If, for some reason at the end of the cutting cycle the press operator has neglected to release trigger 1 or trigger 2, the circuit relay (8CR or 9CR) associated with the unreleased trigger will not de-energize. This will prevent the reactivation of circuit relay 5CR because line 22 contains normally closed contacts 8CR4 and 9CR4 in series. Unless both circuit relays 8CR and 9CR are de-energized, circuit relay 5CR will remain de-energized. Since the contacts for circuit relay 5CR, i.e. 5CR1, 5CR2 and 5CR3, located on lines 7, 21 and 23, respectively, will remain open, this will effectively prevent the operation of the die press (5CR1 prevents energization of 2ML or 2MR, and thus motor B and 5CR3 prevent energization of 7CR and thus down coil 38). This is the anti-tie-down feature, referred to as block 64 in FIG. 1. This anti-tie-down feature prevents reactivation of the press until both triggers have been released, thereby eliminating the safety hazards inherent in having the pressure member moved unexpectedly after the cutting cycle is completed if the press operator has inadvertently neglected to release one of the triggers.

The control apparatus of the present invention can also be utilized to operate the press in a semi-automatic mode. In this mode of operation, as the pressure member ascends, the pressure member will automatically be repositioned to a location remote from the previous cutting operation. In order to initiate the semi-automatic mode of operation, a selector switch 2SS is provided having contacts on line 12, designated as 2SS1 and line 14 designated as 2SS2, both of which are normally opened. When selector switch is turned to the semi-automatic position, these switch contacts are closed.

To initiate the operation, one of the triggers, for instance, trigger 1 is actuated turning on circuit relay 8CR, thus closing contacts 8CR3 on line 19. The closing of contacts 8CR3 on line 19 energizes circuit relay 4CR (contacts 3CR3 are normally closed). The energization of relay 4CR is important as this relay forms a portion of memory circuit 76 and acts as a storage mechanism which preserves information relating to the sequence of actuation of the triggers. As described above, the actuation of trigger 1 and energization of circuit relay 8CR will actuate starter 2ML to move the pressure head to the left and to release brake E. The trigger remains actuated until the pressure head has moved to the appropriate position relative to the material. At this point the other trigger, in this case trigger 2, is actuated. The actuation of both triggers jointly de-actuates motor starter 2ML, thus terminating the horizontal movement of the pressure head. This results from circuit relays 8CR and 9CR being energized simultaneously and the contacts TRI.1 and TRI.2 (lines 7 and 10) being opened simultaneously. Because contacts 8CR1 and normally closed contacts 9CR1 are placed in series on line 7 and contacts 9CR2 and normally closed contacts 8CR2 are placed in series on line 10, if both circuit relays 8CR and 9CR are simultaneously energized at least one of the contacts on each of lines 7 and 10 will be opened, thereby preventing the actuation of either starter 2ML or starter 2MR, thus keeping motor B de-energized and brake E energized.

The energization of circuit relays 8CR and 9CR causes contacts 8CR5 and 9CR5 on line 23 to close, thereby energizing circuit relay 7CR (contacts 5CR2 are closed because relay 5CR is energized and contacts 6CR3 are normally closed). Energization of circuit relay causes contacts 7CR7 on line 34 to close, thus energizing circuit relay 10CR. Energization of circuit relay 10CR closes contacts 10CR1 (line 17) and 10CR2 (line 35). The closing of contacts 10CR1 retains circuit relay 4CR in the energized condition through contacts 4CR3 on line 20. This function corresponds to the memory block designated as 76 in FIG. 2.

If triggers 1 and 2 had been actuated in the other sequence, i.e., trigger 2 before trigger 1, then relay 9CR would have been energized, thus energy relay 3CR and the closing of contacts 10CR1 would have retained circuit relay 3CR with energized condition instead of circuit relay 4CR. Which of the circuit relays 4CR or 3CR is retained in the energized condition by contacts 10CR1 determines the direction in which the pressure head will move after the cutting cycle is completed. If circuit relay 4CR is in the energized condition, then the pressure head will move to the right. On the other hand, if the circuit relay 3CR is held energized, then the pressure head will move to the left.

Since normally closed contacts 3CR3 and 4CR2 are located on lines 18 and 19, respectively, it should be appreciated that circuit relays 4CR and 3CR cannot be both energized by the closing of contacts 10CR1 simultaneously. Only one of the circuit relays 4CR and 3CR can be held energized at one time, that one being determined by the sequence of trigger actuation. However, it should be noted that 10CR1 will not be energized unless both triggers are subsequently actuated jointly because the energization of circuit relay 10CR depends upon the energization of circuit relay 7CR which in turn will not be energized unless circuit relays 8CR and 9CR are jointly energized. The As described above, the joint actuation of triggers 1 and 2 causes down coil 38 to be energized by the closing of contacts 7CR4 on line 27. Thus, the pressure head descends until sensor 42, represented by limit switch 2LS (having normally opened contacts 2LS1 on line 14) closes. The closing of limit switch contacts 2LS1 energizes circuit relay 1CR located on line 13 because selector switch contacts 2SS2 are closed. the second set of contacts for limit switch 2LS2 (located on line 25) opens at the end of the downward movement of the pressure head, thereby causing circuit relay 7CR to de-energize. The de-energization of circuit relay 7CR causes 7CR4 on line 27 to open, thereby de-energizing down coil 18 and causing contacts 7CR5 on line 28 to close, thereby energizing up coil 52 and the pressure head begins to ascend. Contacts 2SL1 close at the end of the downward movement of the pressure head, thereby energizing circuit relay 1CR, as indicated above, and also energizing timer relay 1TR located on line 14.

Timer 1TR, which corresponds functionally to block 70 in FIG. 2, provides a delay of a predetermined time interval from the time at which pressure head reverses direction from its downward movement to upward movement. This delay is provided to permit the pressure head to withdraw from the material prior to the horizontal movement thereof, thereby preventing the horizontal movement of the pressure head from tearing the material.

At the end of the time interval, timer 1TR closes contacts 1TR1 and 1TR2 on lines 15 and 16, respectively. The closing of contacts 1TR1 and 1TR2 energizes timer 72 represented as timer 2TR on line 15 and circuit relay 2CR on line 16, respectively. The energization of circuit relay 2CR closes contacts 2CR2 on line 12 which in turn energizes motor starter 2MR on line 10, thus causing the pressure member to move to the right.

Which of the motor starters 2ML or 2MR is energized by the closing of contacts 2CR1 and 2CR2 is determined by whether contacts 3CR1 on line 8 or 4CR1 on line 9 are energized. As explained above, which of the circuit relays 3CR or 4CR is energized depends upon the sequence of actuation of the trigger D. In this case, since trigger 1 was actuated last, circuit relay 4CR is energized and contacts 4CR1 are closed, thus permitting energization of starter 2MR. Had trigger 2 been actuated last, then circuit relay 3CR would be energized and contacts 3CR1 closed, thus turning on motor starter 2ML and causing the pressure member to move to the left.

Contacts 2TR1 on line 12 and 2TR2 on line 13 remain in the closed position until timer 2TR has completed the timing cycle. At the end of this cycle, timer 2TR turns off, thereby opening contacts 2TR1 and 2TR2. When contacts 2TR1 and 2TR2 open, motor starter 2MR is de-energized, thus shutting off motor B and stopping the movement of the pressure member. Brake E is also de-energized. Circuit relays 1CR on line 12, 2CR on line 16 and 10CR on line 34 are de-energized. In this manner, the pressure member is automatically moved after a given delay a distance determined by timer 2TR and in a direction determined by memory circuit 76 which comprises circuit relay 10CR and associated contacts.

It can be seen that the present invention is a control apparatus which can be manipulated through the use of a single pair of triggers or push buttons located anywhere on the press. Preferably these push buttons are located on the handle member of the die carriage but other locations may also be utilized. By depressing the triggers individually, the horizontal movement of the pressure member is controlled. By depressing the triggers jointly, the vertical movement of the pressure member is initiated. After the operation has been performed, the vertical motion of the pressure member automatically reverses causing the pressure member to ascend. The apparatus can also be operated in the semi-automatic mode. In this case, as the pressure member ascends, horizontal movement of the pressure member will automatically be initiated after a given time delay. This delay is incorporated to permit the pressure member to clear the material prior to horizontal movement thereof. The direction of this horizontal movement of the pressure member will be determined by the sequence of actuation of the triggers.

While but a single preferred embodiment of the present invention has been specifically disclosed herein for purposes of illustration, it is apparent that many modifications and variations may be made therein. It is intended to cover all of these variations and modifications to fall within the scope of this invention as defined by the appended claims.

What is claimed is:

1. Apparatus for controlling the movement of a member in a first sense and a second sense comprising first means for moving the member in first and second directions in the first sense and second means for moving the member in first and second directions in the second sense and first and second switch means operatively connected to said first and second moving means and actuatable separately to energize said first means to move the member in said first direction in said first sense and said second direction in said first sense, respectively, and actuatable jointly to energize said second means to move the member in said first direction in said second sense.

2. The apparatus of claim 1 further comprising third switch means located in the path of movement of the member in said second sense and actuatable by the movement of the member at a given point in the path of movement of the member in said first direction in said second sense to cause said second means to reverse direction.

3. The apparatus of claim 2 further comprising fourth switch means located in the path of movement of the member in said second sense and actuatable by the movement of the member at a given point in the path of movement of the member in the second direction in said second sense to de-energize said second means.

4. The apparatus of claim 1 further comprising means for preventing movement of the member in said first sense, said movement preventing means being energized by the separate actuation of either of said first and said second switch means to prevent movement of said member in said first sense and being de-energized by the joint actuation of said first and said second switch means to prevent movement of said member in said first sense.

5. The apparatus of claim 1 further comprising fifth and sixth switch means located in the path of movement of the member in said first direction in said first sense and said second direction in said first sense respectively, each of said fifth and sixth switch means effective to de-energize said first means when actuated by the movement of the member at given respective points in the path of movement of the member.

6. The apparatus of claim 4 further comprising fifth and sixth switch means located in the path of movement of the member in said first direction in said first sense and said second direction in said first sense respectively, each of said fifth and sixth switch means effective to de-energize said first means when actuated by the movement of the member at given respective points in the path of movement of the member.

7. The apparatus of claim 6 wherein said movement preventing means is de-energized by the actuation of either of said fifth and said sixth switch means.

8. The apparatus of claim 3 further comprising means for preventing the re-energization of said first means by said first and second switch means after the activation of said fourth switch means until both said first and said second switch means are de-actuated simultaneously.

9. The apparatus of claim 2 further comprising first timing means energized by the actuation of said third switch means and effective, a first time interval after energization, to energize said first means to move the member in one of said first and said second directions in said first sense.

10. The apparatus of claim 9 further comprising second timing means energized by said first timing means to de-energize said first means a second time interval after the energization thereof.

11. The apparatus of claim 10 further comprising means for preventing movement of the member in said first sense, said movement preventing means being energized by the separate actuation of either of said first and said second switch means to prevent movement of said member in said first sense and being de-energized by the joint actuation of said first and said second switch means to prevent movement of said member in said first sense.

12. The apparatus of claim 1 further comprising means for storing information relating to the sequence of actuation of said first and second switch means when both of said first and second switch means are jointly actuated.

13. The apparatus of claim 11 further comprising means for storing information relating to the sequence of actuation of said first and said second switch means when both of said first and second switch means are jointly actuated.

14. The apparatus of claim 13 wherein said first timing means, after said first time interval, actuates said information storing means to energize said first means to move the member in the direction in said first sense which said first means would move the member if the second of said first and second switch means to be actuated in sequence had been actuated alone.

15. The apparatus of claim 13 wherein said information storage means determines the direction of movement of the member when said first means is energized by said first timing means.

* * * * *